(12) United States Patent
Kalhan

(10) Patent No.: US 11,558,851 B2
(45) Date of Patent: Jan. 17, 2023

(54) BROADCAST TRANSMISSION BY RELAY NODE

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 183 days.

(21) Appl. No.: 17/040,718

(22) PCT Filed: Apr. 23, 2019

(86) PCT No.: PCT/US2019/028637
§ 371 (c)(1),
(2) Date: Sep. 23, 2020

(87) PCT Pub. No.: WO2019/209778
PCT Pub. Date: Oct. 31, 2019

(65) Prior Publication Data
US 2021/0014829 A1 Jan. 14, 2021

Related U.S. Application Data

(60) Provisional application No. 62/682,090, filed on Jun. 7, 2018, provisional application No. 62/682,095, filed (Continued)

(51) Int. Cl.
*H04W 72/00* (2009.01)
*H04W 4/06* (2009.01)
(Continued)

(52) U.S. Cl.
CPC ......... *H04W 72/005* (2013.01); *G16Y 30/00* (2020.01); *G16Y 40/35* (2020.01); *H04B 7/155* (2013.01);
(Continued)

(58) Field of Classification Search
CPC ... H04W 72/005; H04W 72/042; H04W 4/06; H04W 4/08; H04W 4/70; H04W 24/10;
(Continued)

(56) References Cited

U.S. PATENT DOCUMENTS 10,149,099 B2 12/2018 Kim et al.
2009/0199069 A1* 8/2009 Palanki ................ H04L 1/0065
714/755
(Continued)

FOREIGN PATENT DOCUMENTS

WO 2017161265 A1 9/2017

*Primary Examiner* — Joshua Kading

(57) ABSTRACT

A donor communication station transmits a unicast transmission comprising a plurality of device data sets where each device data set directed to each of a plurality of user equipment (UE) devices. A relay node receives the unicast transmission and retransmits the data sets in a broadcast transmission over a broadcast communication channel to the plurality of UE devices. In one example, the donor communication station encodes data for multiple user equipment (UE) devices by applying broadcast encoding to the data for each device before applying outer encoding to the data. The dual encoded data is transmitted to the relay node over a dedicated channel. The relay node applies outer decoding to the dual encoded data to retrieve the broadcast encoded data. The relay node then transmits the broadcast encoded device data in a broadcast transmission without outer encoding.

22 Claims, 7 Drawing Sheets

Related U.S. Application Data on Jun. 7, 2018, provisional application No. 62/682,081, filed on Jun. 7, 2018, provisional application No. 62/661,253, filed on Apr. 23, 2018.

(51) Int. Cl.

| | | |
|---|---|---|
| *H04W 84/04* | (2009.01) | |
| *G16Y 30/00* | (2020.01) | |
| *G16Y 40/35* | (2020.01) | |
| *H04L 1/18* | (2006.01) | |
| *H04L 1/00* | (2006.01) | |
| *H04W 4/08* | (2009.01) | |
| *H04W 84/18* | (2009.01) | |
| *H04B 17/318* | (2015.01) | |
| *H04B 7/155* | (2006.01) | |
| *H04L 1/08* | (2006.01) | |
| *H04L 43/16* | (2022.01) | |
| *H04W 24/10* | (2009.01) | |
| *H04W 72/04* | (2009.01) | |
| *H04L 5/00* | (2006.01) | |
| *H04L 12/18* | (2006.01) | |
| *H04W 48/12* | (2009.01) | |
| *H04W 4/70* | (2018.01) | |
| *H04W 28/18* | (2009.01) | |

(52) U.S. Cl.
CPC ......... *H04B 17/318* (2015.01); *H04L 1/0003* (2013.01); *H04L 1/0035* (2013.01); *H04L 1/08* (2013.01); *H04L 1/1812* (2013.01); *H04L 1/1819* (2013.01); *H04L 1/1896* (2013.01); *H04L 5/0055* (2013.01); *H04L 12/1863* (2013.01); *H04L 43/16* (2013.01); *H04W 4/06* (2013.01); *H04W 4/08* (2013.01); *H04W 4/70* (2018.02); *H04W 24/10* (2013.01); *H04W 28/18* (2013.01); *H04W 48/12* (2013.01); *H04W 72/042* (2013.01); *H04W 84/18* (2013.01); *H04L 2001/0097* (2013.01); *H04W 84/047* (2013.01)

(58) Field of Classification Search
CPC ..... H04W 28/18; H04W 28/20; H04W 28/22; H04W 48/12; H04W 84/18; H04W 84/047; G16Y 30/00; G16Y 40/35; H04B 7/155; H04B 17/318; H04L 1/0003; H04L 1/0009; H04L 1/0035; H04L 1/08; H04L 1/1812; H04L 1/1819; H04L 1/1896; H04L 5/0053; H04L 5/0055; H04L 12/1863; H04L 43/16; H04L 2001/0097

See application file for complete search history.

(56) References Cited

U.S. PATENT DOCUMENTS

| | | | |
|---|---|---|---|
| 2011/0170474 A1* | 7/2011 | Ji | H04L 1/18 370/315 |
| 2011/0243053 A1 | 10/2011 | Tinnakornsrisuphap et al. | |
| 2011/0244788 A1 | 10/2011 | Ode et al. | |
| 2013/0039262 A1* | 2/2013 | Lim | H04B 7/155 370/315 |
| 2014/0020031 A1* | 1/2014 | Barrett | H04W 72/005 725/62 |
| 2016/0205664 A1 | 7/2016 | Zhang et al. | |
| 2018/0116007 A1* | 4/2018 | Yasukawa | H04W 72/1263 |
| 2018/0132059 A1* | 5/2018 | Kim | H04W 76/23 |
| 2018/0199301 A1* | 7/2018 | Hori | H04L 65/4061 |
| 2018/0213379 A1* | 7/2018 | Xiong | H04W 4/70 |
| 2018/0213577 A1* | 7/2018 | Burbidge | H04W 76/10 |
| 2018/0235027 A1* | 8/2018 | Adachi | H04W 76/14 |
| 2020/0204386 A1* | 6/2020 | Jiang | H04L 12/1881 |

* cited by examiner

BROADCAST TRANSMISSION BY RELAY NODE

CLAIM OF PRIORITY

The present application claims the benefit of priority to Provisional Application No. 62/661,253, entitled "Broadcast Based Relaying To The IOT Devices", filed Apr. 23, 2018, Provisional Application No. 62/682,081, entitled "CONTROL INFORMATION FROM MICROCELL TO NODE, MAPPING BLOCKS TO UE ID", filed Jun. 7, 2018, Provisional Application No. 62/682,090, entitled "MULTIUSER BROADCAST TRANSMISSION NODE", filed Jun. 7, 2018, and Provisional Application No. 62/682,095, entitled "METHOD OF DETERMINING NUMBER OF REPETITIONS FOR MULTIUSER BROADCAST IN IOT DEPLOYMENTS", filed Jun. 7, 2018, all of which are assigned to the assignee hereof and hereby expressly incorporated by reference in their entirety.

FIELD

This invention generally relates to wireless communications and more particularly to broadcast transmission by a relay node.

BACKGROUND

In some situations, User Equipment (UE) devices must operate at the fringe of coverage areas. Internet of Things (IOT) and Machine Type Communication UE devices, for example, often operate in deep coverage areas where the downlink received signal strength is very poor. In extreme scenarios, the received signal strength at the MTC UE device receiver could have a signal-to-noise ratio (SNR) as low as −14 dB. In some conventional systems, relay nodes are deployed for retransmissions to the hard to reach MTC UE devices. Due to the closer proximity, the relay nodes improve the received signal strength at the expense of higher complexity. Increase in complexity is a result of interference management (in-band relays) and the control signaling for managing the base station-relay node downlink transmission and scheduling of the relay node—MTC device links.

SUMMARY

A donor communication station transmits a unicast transmission signal comprising a plurality of device data sets where each device data set directed to each of a plurality of user equipment (UE) devices. A relay node receives the unicast transmission and retransmits the data sets in a broadcast transmission over a broadcast communication channel to the plurality of UE devices. In one example, the donor communication station encodes data for multiple user equipment (UE) devices by applying broadcast encoding to the data for each device before applying outer encoding coding parameters to the data. The dual encoded data is transmitted to the relay node over a dedicated channel. The relay node decodes the outer encoding to the dual encoded data to retrieve the broadcast encoded data. The relay node then transmits the broadcast encoded device data in a broadcast transmission without the outer encoding.

DETAILED DESCRIPTION

As discussed above, communication devices, such as MTC and IOT UE devices, operate in areas with low downlink signal strength. In some conventional system, relay nodes are deployed to retransmit downlink signals to increase receive signal strength at the UE devices. The relay nodes, however, improve the received signal strength at the expense of higher complexity. For example, interference management for in-band relays increases complexity. Also, increased control signaling is needed for managing the base station-relay node downlink transmission and scheduling of the relay node—MTC device links. For the examples described herein, however, a relay node retransmits mobile device data in a broadcast transmission. The relay node receives a unicast transmission from a donor communication station that includes mobile device data for a plurality of UE devices. In some examples, the donor communication station encodes the mobile device data for multiple UE devices by applying broadcast encoding (inner encoding) to the data for each device before applying outer encoding parameters to the data. The dual encoded data is transmitted to the relay device over a dedicated channel. The relay device decodes the outer encoding to retrieve the broadcast encoded data. The relay device transmits the broadcast encoded device data in a broadcast transmission without the outer encoding. Each UE device receives and decodes the data intended for the UE device. In some situations, the outer encoding is channel-aware encoding based on feedback received at the donor communication station from the relay node.

Figure 1A:
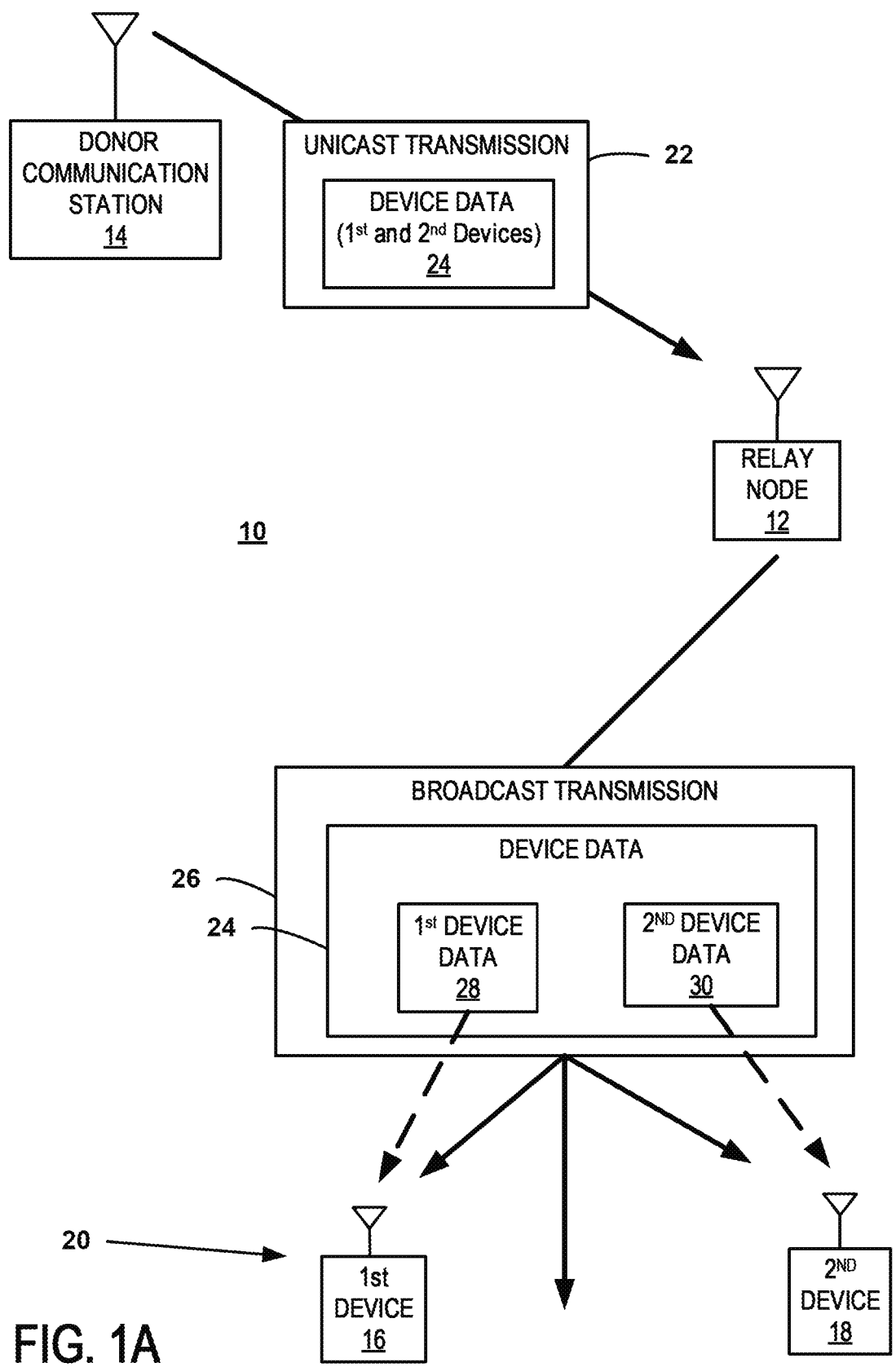
FIG. 1A is a block diagram of an example of a communication system including a relay node that broadcasts data received in a unicast transmission from a donor communication station.

FIG. 1A is a block diagram of an example of a communication system 10 including a relay node 12 that broadcasts data received in a unicast transmission from a donor communication station 14. The communication system 10 is part of a radio access network (not shown) that provides various wireless services to communication devices that are located within the respective service areas of the various base stations that are part of the radio access network. In the interest of clarity and brevity, the communication system 10 of FIG. 1A is shown as having only one donor communication station 14 and only one relay node 12. The communication system 10 may include any number of base stations, communications stations, and relay nodes. Although FIG. 1A shows two UE devices 16, 18, the plurality of UE devices 20 may include numerous devices within the range of the relay node 12. The communication system 10 may operate in accordance with one or more communication specifications such as, revisions of the 3rd Generation Partnership Project Long Term Evolution (3GPP LTE) communication specification, revisions of the 5G New Radio communication specification, and IEEE 802.11 communication standards.

The donor communication station 14 and the relay node 12 may be referred to as transceiver stations, access points, eNodeBs or eNBs where the applied terms sometimes may depend on the communication technology that the devices support. In the case of implementations that utilize the 5G New Radio air interface, a base station is sometimes referred to as a gNB and a donor communication station is sometimes referred to as a DgNB. The base stations (communication stations) 14 typically communicate with the wireless user equipment communication devices by transmitting downlink signals to the communication devices and receiving uplink signals. In situations where the communication device is at the fringe of a coverage area of the base station such as the communication station 14, the relay node 12 receives the downlink signal from the base station and transmits a corresponding signal to the communication device.

For the example of FIG. 1A, the donor communication station 14 transmits a unicast transmission 22 to the relay node 12 that includes mobile device data 24 for a plurality of mobile devices 20. Therefore, the unicast transmission 22 is transmitted on dedicated data channel to the relay node 12. The relay node 12 receives the unicast transmission 22 and retransmits the mobile device data 24 in a broadcast transmission 26. Each UE device 16, 18 receives the broadcast transmission 26 and retrieves the device data 28, 30 directed to the particular UE device 16, 18. Accordingly, a first UE device 16 receives the first device data 28 and the second UE device 18 receives the second device data 30.

For the examples herein, the relay node 12 applies the same code rate and modulation order to each of the individual data streams. In some situations, the code rate and/or the modulation order may be different. The relay node may use any various communication techniques when broadcasting the device data 24. For example, the broadcast transmission may be transmitted using time division multiplexing (TDM) frequency division multiplexing (FDM), space division multiplexing (SDM), code division multiplexing (CDM) or any combination thereof. The use of FDM may provide some additional advantages in some situations by assigning a subset of carriers that are only a portion of the entire downlink bandwidth. The narrowband receivers can then be used at the UE devices to receive the subset of carriers.

In other situations, frequency-hopping can be used where a narrowband data is hopped across the whole bandwidth using a UE-specific hopping pattern. An example of a suitable frequency hopping control arrangement includes using PHY control signaling or higher-layer (RRC) signaling to assign the hopping pattern and/or the subcarrier subset. In some circumstances, blind or HARQ based retransmissions can be applied to the broadcast transmission to increase robustness of the relay node to UE device communication links.

In one example, each UE device is assigned a first subset of carriers for a broadcast transmission and different subsets of carriers for retransmission broadcasts. As a result, the information is frequency-hopped across the bandwidth. Such a scheme improves reception at the UE device since at least some broadcast retransmissions may avoid deep fades or interference.

Figure 1B:
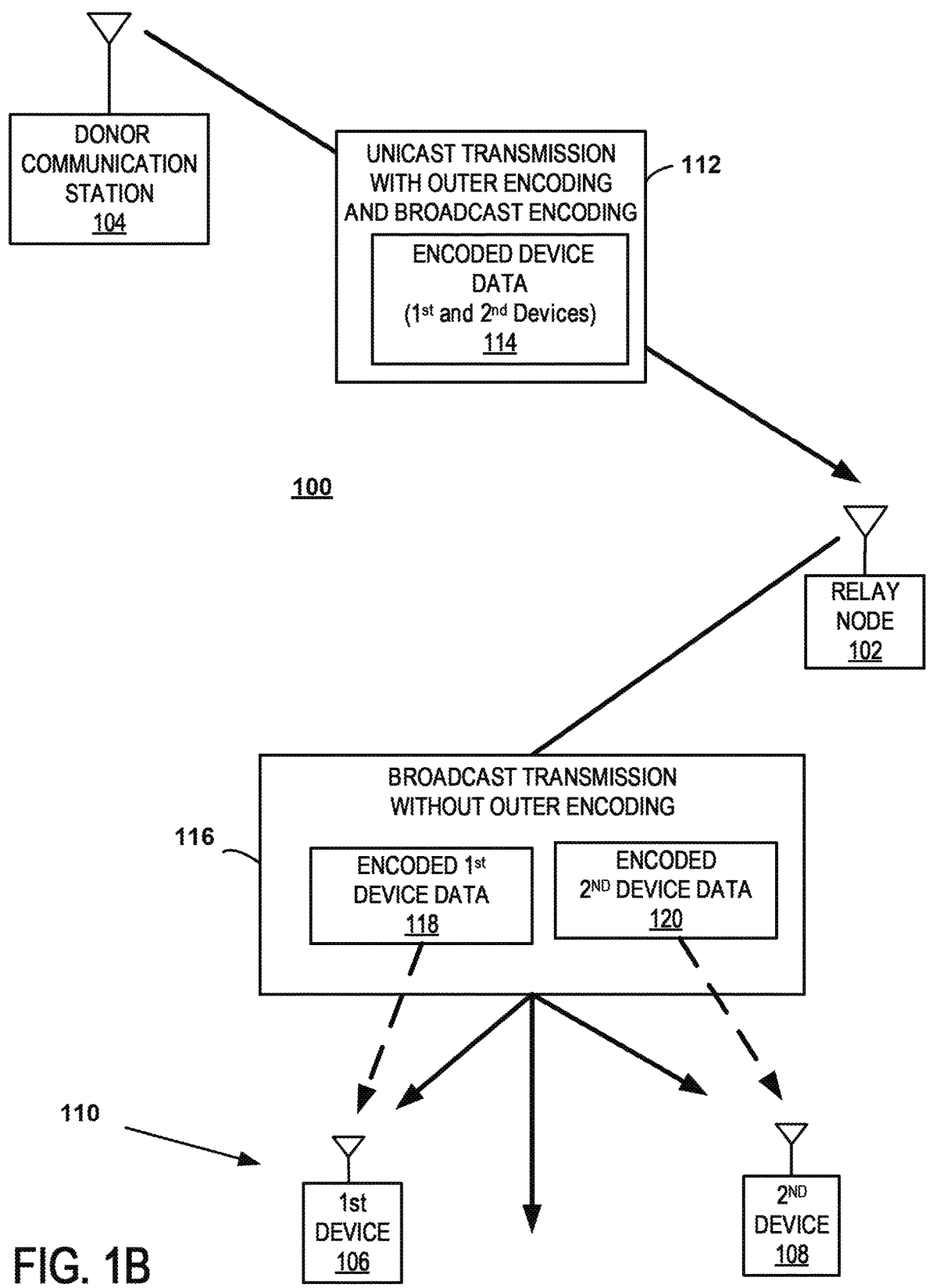
FIG. 1B is a block diagram of an example of a communication system including a relay device that broadcasts data received in a unicast transmission from a donor communication station where the unicast transmission is dual encoded.

FIG. 1B is a block diagram of an example of a communication system 100 including a relay device 102 that broadcasts data received in a unicast transmission from a donor communication station 104 where the unicast transmission is dual encoded. The unicast transmission includes device data that is broadcast encoded and outer encoded. The communication system 100, therefore, is an example of the communication system 10 of FIG. 1B where the transmission from the donor communication station 104 is dual encoded and the transmission from the relay node 102 does not include outer encoding. For the example, the various blocks shown in FIG. 1B represent devices, equipment, circuitry and/or code that is configured to perform various functions and processes described herein. Although each function is shown as a separate box, the elements that perform the recited functions for each box may be configured to perform the functions for multiple boxes. In addition, functions described as performed in a single box may be implemented over several devices or elements.

The communication system 100 is part of a radio access network (not shown) that provides various wireless services to communication devices that are located within the respective service areas of the various base stations that are part of the radio access network. In the interest of clarity and brevity, the communication system 100 of FIG. 1B is shown as having only one donor communication station 104 and only one relay node 102. The communication system 100 may include any number of base stations, communications stations, and relay nodes. Although FIG. 1B shows two UE devices 106, 108, the plurality of UE devices 110 may include numerous devices within the range of the relay node 102. The communication system 100 may operate in accordance with one or more communication specifications such as, revisions of the 3rd Generation Partnership Project Long Term Evolution (3GPP LTE) communication specification, revisions of the 5G New Radio communication specification, and IEEE 802.11 communication standards.

The donor communication station 104 and the relay node 102 may be referred to as transceiver stations, access points, eNodeBs or eNBs where the applied terms sometimes may depend on the communication technology that the devices support. In the case of implementations that utilize the 5G New Radio air interface, a base station is sometimes referred to as a gNB and a donor communication station is sometimes referred to as a DgNB. The base stations (communication stations) 104 typically communicate with the wireless user equipment communication devices by transmitting downlink signals to the communication devices and receiving uplink signals. In situations where the communication device is at the fringe of a coverage area of the base station such as the communication station 104, the relay node 102 receives the downlink signal from the communication station and transmits a corresponding signal to the communication device.

For the example of FIG. 1B, the donor communication station 104 transmits a unicast transmission 112 to the relay node 102 that includes mobile device data 114 for a plurality of mobile devices 110. Therefore, the unicast transmission 112 is transmitted on a dedicated data channel to the relay node 102. The relay node 102 receives the unicast transmission 112 and retransmits the mobile device data 114 in a broadcast transmission 116. Each UE device 106, 108 receives the broadcast transmission 116 and retrieves the device data 118, 120 directed to the particular UE device 106, 108. Accordingly, a first UE device 106 receives the encoded first device data 118 and the second UE device 108 receives the encoded second device data 120.

In some situations, the device data 114 is dual encoded in the unicast transmission 112. For the example of FIG. 1B, the device data 114 is broadcast encoded and then outer encoded. As discussed below in further detail, the donor communication station 104 applies broadcast channel encoding to each device data, multiplexes the resulting broadcast encoded data, and applies outer encoding to the multiplexed data. The relay station decodes the received unicast transmission to decode the outer encoding. After demultiplexing the device data, the relay node modulates the individual encoded data streams. The individual encoded data streams are mapped to communication resources and broadcasted to the UE devices 110. The broadcast transmission retains the inner, broadcast encoding but no longer includes the outer encoding. Although various forms of outer encoding may be used, an example of a suitable outer encoding technique includes using channel-aware encoding. In such an example, the relay node provides channel feedback to the donor communication station regarding the channel between the donor communication station and the relay node.

Therefore, for one example, the relay node 102 decodes the channel-aware encoding applied by the donor communication station 104 but leaves the broadcast encoding on the individual data streams intact. As a result, the broadcast transmission from the relay no longer includes the channel aware encoding but retrains the broadcast encoding that was applied by the donor communication station. The UE devices do not need to decode the channel-aware encoding and only apply decoding parameters corresponding to the broadcast encoding.

Figure 2:
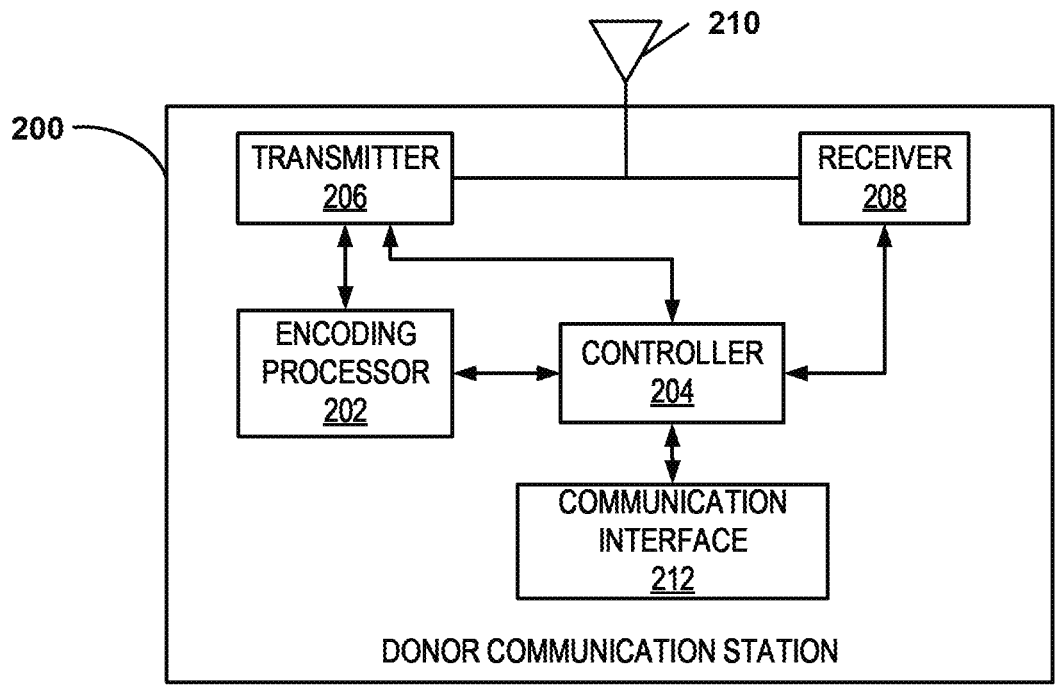
FIG. 2 is a block diagram of an example of a donor communication station suitable for use as the donor communication station.

FIG. 2 is a block diagram of an example of a donor communication station 200 suitable for use as the donor communication station 104. The communication station 200 includes an encoding processor 202, a controller 204, transmitter 206, and receiver 208, as well as other electronics, hardware, and code. The donor communication station 200 is any fixed, mobile, or portable equipment that performs the functions described herein. The various functions and operations of the blocks described with reference to the donor communication stations 104, 200 may be implemented in any number of devices, circuits, or elements. Two or more of the functional blocks may be integrated in a single device, and the functions described as performed in any single device may be implemented over several devices. The donor communication station 200 may be a fixed device or apparatus that is installed at a particular location at the time of system deployment. Examples of such equipment include fixed base stations or fixed transceiver stations. In some situations, the donor communication station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the donor communication station 200 may be a portable device that is not fixed to any particular location. Accordingly, the communication station 200 may be a portable user device such as a mobile communication device (UE device) in some circumstances.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the donor communication station functions. The required components may depend on the particular functionality required by the donor communication station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the donor communication station 200 in accordance with one of a plurality of modulation orders. The encoding processor 202 includes components and code that encodes data for transmission. An example of a suitable encoding processor 202 is discussed below with reference to FIG. 5.

For the example, the donor communication station 200 includes a communication interface 212 for transmitting and receiving transmissions with other communication stations and base stations. The communication interface 212 may be connected to a backhaul or network enabling communication with other donor communication stations. In some situations, a link between the donor communication stations and other base stations may include at least some wireless portions. The communication interface 212, therefore, may include wireless communication functionality and may utilize some of the components of the transmitter 206 and/or receiver 208.

Figure 3:
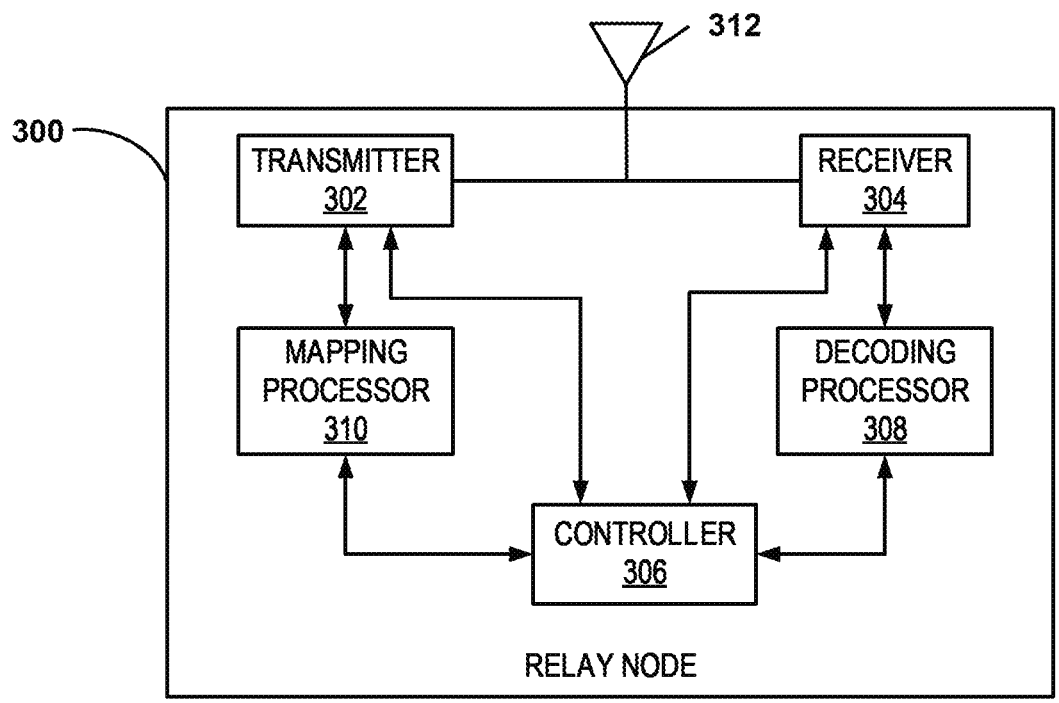
FIG. 3 is a block diagram of an example of a relay node suitable for use as the relay node.

FIG. 3 is a block diagram of an example of a relay node 300 suitable for use as the relay node 102. The relay node 300 includes transmitter 302, a receiver 304, a controller 306, a decoding processor 308, and a mapping processor 310 as well as other electronics, hardware, and code. The relay node 300 is any fixed, mobile, or portable equipment that performs the functions described herein. The various functions and operations of the blocks described with reference to the relay nodes 102, 300 may be implemented in any number of devices, circuits, or elements. Two or more of the functional blocks may be integrated in a single device, and the functions described as performed in any single device may be implemented over several devices. The relay node 300 may be a fixed device or apparatus that is installed at a particular location at the time of system deployment. Examples of such equipment include fixed base stations or fixed transceiver stations. In some situations, the relay node 300 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the relay node 300 may be a portable device that is not fixed to any particular location. Accordingly, the relay node 300 may be a portable user device such as a mobile communication device (UE device) in some circumstances.

The controller 306 includes any combination of hardware, software, and/or firmware for executing the functions described herein as well as facilitating the overall functionality of the relay node 300. An example of a suitable controller 306 includes code running on a microprocessor or processor arrangement connected to memory. The transmitter 302 includes electronics configured to transmit wireless signals. In some situations, the transmitter 302 may include multiple transmitters. The receiver 304 includes electronics configured to receive wireless signals. In some situations, the receiver 304 may include multiple receivers. The receiver 304 and transmitter 302 receive and transmit signals, respectively, through an antenna 312. The antenna 312 may include separate transmit and receive antennas. In some circumstances, the antenna 312 may include multiple transmit and receive antennas. In any case, the antenna or antennas 312 are configured to transmit signals to and receive signals from the communication station and to transmit signals to and receive signals from UE devices.

The transmitter 302 and receiver 304 in the example of FIG. 3 perform radio frequency (RF) processing including modulation and demodulation. The receiver 304, therefore, may include components such as low noise amplifiers (LNAs) and filters. The transmitter 302 may include filters and amplifiers. Other components may include isolators, matching circuits, and other RF components. The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the donor communication station 200 in accordance with one of a plurality of modulation orders.

The decoding processor 308, which may be part of the receiver in some situations, decodes signals received from the communication station 104. For the example, the decoding processor 308 performs outer decoding of the received signals where the decoding corresponds to the outer encoding applied by the communication station 104. The mapping processor 310, which may be part of the transmitter in some situations, performs resource mapping functions to map data for transmission to the UE devices. As discussed above, the outer encoding and decoding may be based on channel-aware encoding techniques.

These, and possibly other, components in combination or cooperation with transmitter and receiver perform the relay node functions. The required components may depend on the particular functionality required by the relay node 102.

Figure 4:
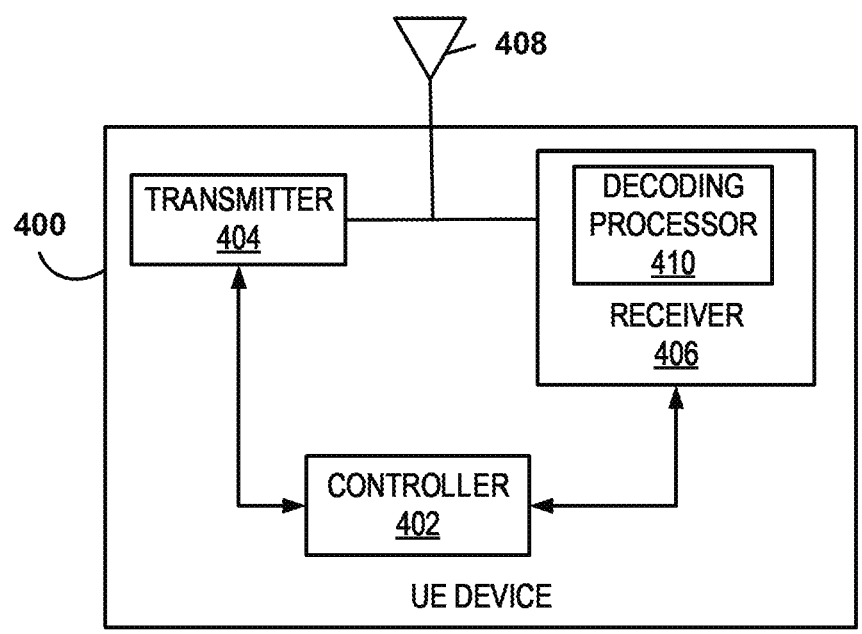
FIG. 4 is a block diagram of an example of a UE communication device suitable for use as the communication devices of FIG. 1.

FIG. 4 is a block diagram of an example of a UE communication device 400 suitable for use as the communication devices 110 of FIG. 1. In some examples, the communication device 400 is any wireless communication device such as a mobile phone, a transceiver modem, a personal digital assistant (PDA), a tablet, or a smartphone. For the examples discussed below, the communication device 400 is a machine type communication (MTC) communication device or Internet-of-Things (IOT) device. The communication device 400, therefore is any fixed, mobile, or portable equipment that performs the functions described herein. The various functions and operations of the blocks described with reference to communication device 400 may be implemented in any number of devices, circuits, or elements. Two or more of the functional blocks may be integrated in a single device, and the functions described as performed in any single device may be implemented over several devices.

The communication device 400 includes at least a controller 402, a transmitter 404 and a receiver 406. The controller 402 includes any combination of hardware, software, and/or firmware for executing the functions described herein as well as facilitating the overall functionality of a communication device. An example of a suitable controller 402 includes code running on a microprocessor or processor arrangement connected to memory. The transmitter 404 includes electronics configured to transmit wireless signals. In some situations, the transmitter 404 may include multiple transmitters. The receiver 406 includes electronics configured to receive wireless signals. In some situations, the receiver 406 may include multiple receivers. The receiver 404 and transmitter 406 receive and transmit signals, respectively, through antenna 408. The antenna 408 may include separate transmit and receive antennas. In some circumstances, the antenna 408 may include multiple transmit and receive antennas.

The transmitter 404 and receiver 406 in the example of FIG. 4 perform radio frequency (RF) processing including modulation and demodulation. The receiver 404, therefore, may include components such as low noise amplifiers (LNAs) and filters. The transmitter 406 may include filters and amplifiers. Other components may include isolators, matching circuits, and other RF components. These components in combination or cooperation with other components perform the communication device functions. The required components may depend on the particular functionality required by the communication device.

The transmitter 406 includes a modulator (not shown), and the receiver 404 includes a demodulator (not shown). The modulator can apply any one of a plurality of modulation orders to modulate the signals to be transmitted as part of the uplink signals. The demodulator may demodulate the downlink signals in accordance with one of a plurality of modulation orders. The receiver includes, or is connected to, a decoding processor 412. In the example, the decoding processor 412 applies broadcast decoding parameters to decode the signals received from the relay node. The broadcast decoding parameters correspond to the broadcast encoding parameters applied to the device data by the donor communication station 104.

Figure 5:
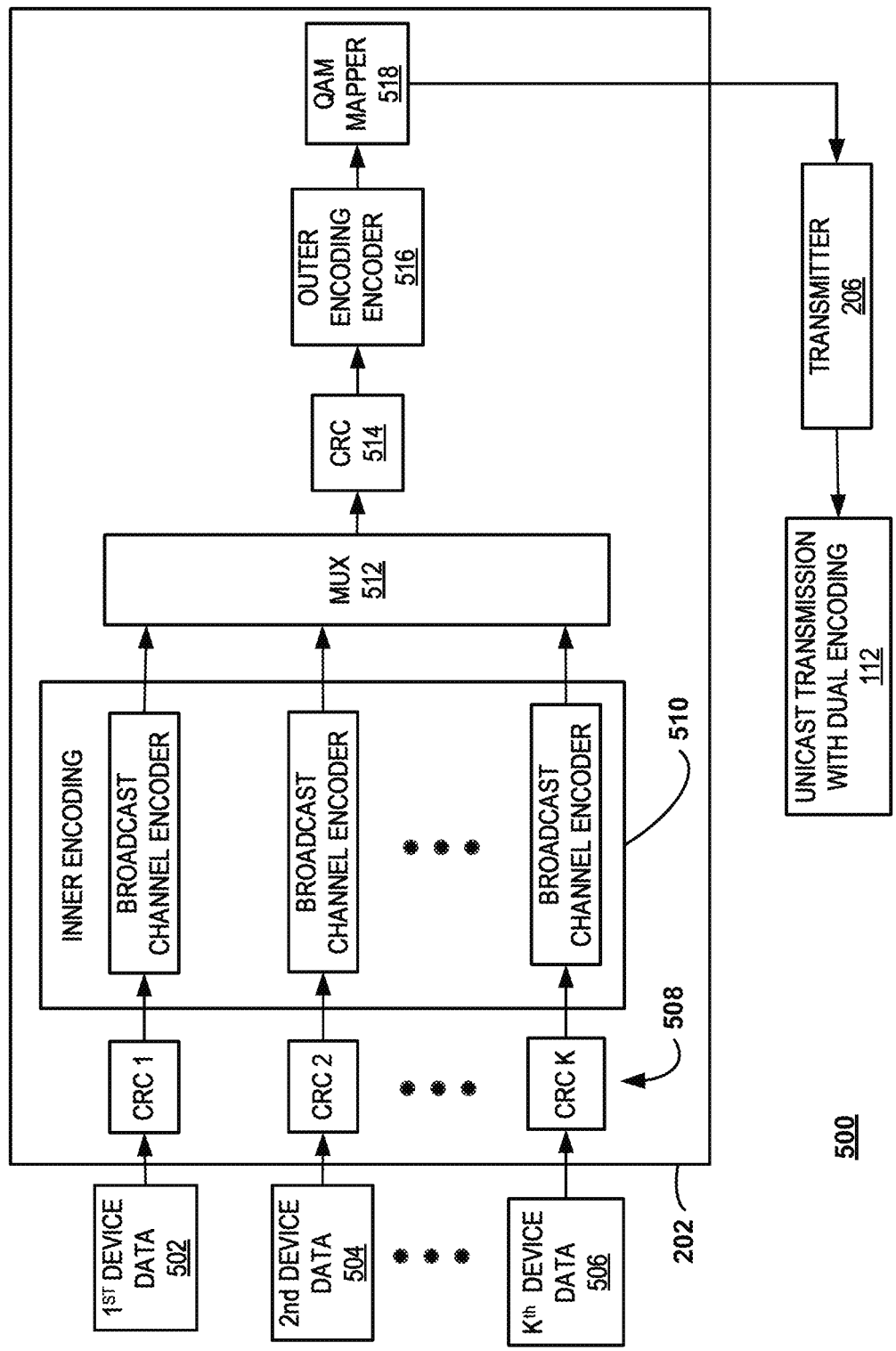
FIG. 5 is a block diagram of an example of the encoder processor and the transmitter in a donor communication station performing dual encoding.

FIG. 5 is a block diagram of an example of the encoding processor 202 and the transmitter 206 in a donor communication station performing dual encoding. The example of FIG. 5 is suitable for implementation in the donor communication station 104, 200. Device data for a plurality of MTC UE devices includes first device data 502, second device data 504, and Kth device data 506 for K devices, where K is greater than one. A cyclic redundancy check (CRC) is added to each device by a CRC processor 508. Each device data 502, 504, 506 with CRC is then broadcast channel encoded by a broadcast channel encoder 510. Typically, the code rates are same for all the streams. In one approach, the code rate is based on the worst channel conditions and the code-rate is selected and applied to all the streams. The code-rates are also the function of the modulation order. In some situations, the code rate and modulation order are determined by the relay node and conveyed to the donor communication station on a semi-static arrangement. In other situations, the code rate and modulation order can be based on a predefined Modulation and Coding Scheme (MCS) for broadcasting. In one example, the relay node determines the MCS and informs the donor communication station of the preferred MCS for use when applying the broadcast encoding.

The broadcast encoded data for the UE MTC devices is then multiplexed by a multiplexer (MUX) 512 to generate a single multiplexed data stream. A CRC is added to the stream by a CRC processor 514 before an outer encoder 516 encodes the data stream by applying outer encoding parameters to the data stream. The outer encoding parameters are based on the communication channel between the donor communication station and the relay node. The outer encoding parameters are determined in accordance with known techniques where the code rates at least partially depend on the modulation order. The QAM mapper 518 maps the data to the quadrature amplitude modulation (QAM) constellation in accordance with known techniques. The resulting dual encoded signal is transmitted by the transmitter 206 as a unicast transmission with outer encoding 112 to the relay node 102. As mentioned above, the outer encoding may include channel-aware encoding in some situations.

Figure 6:
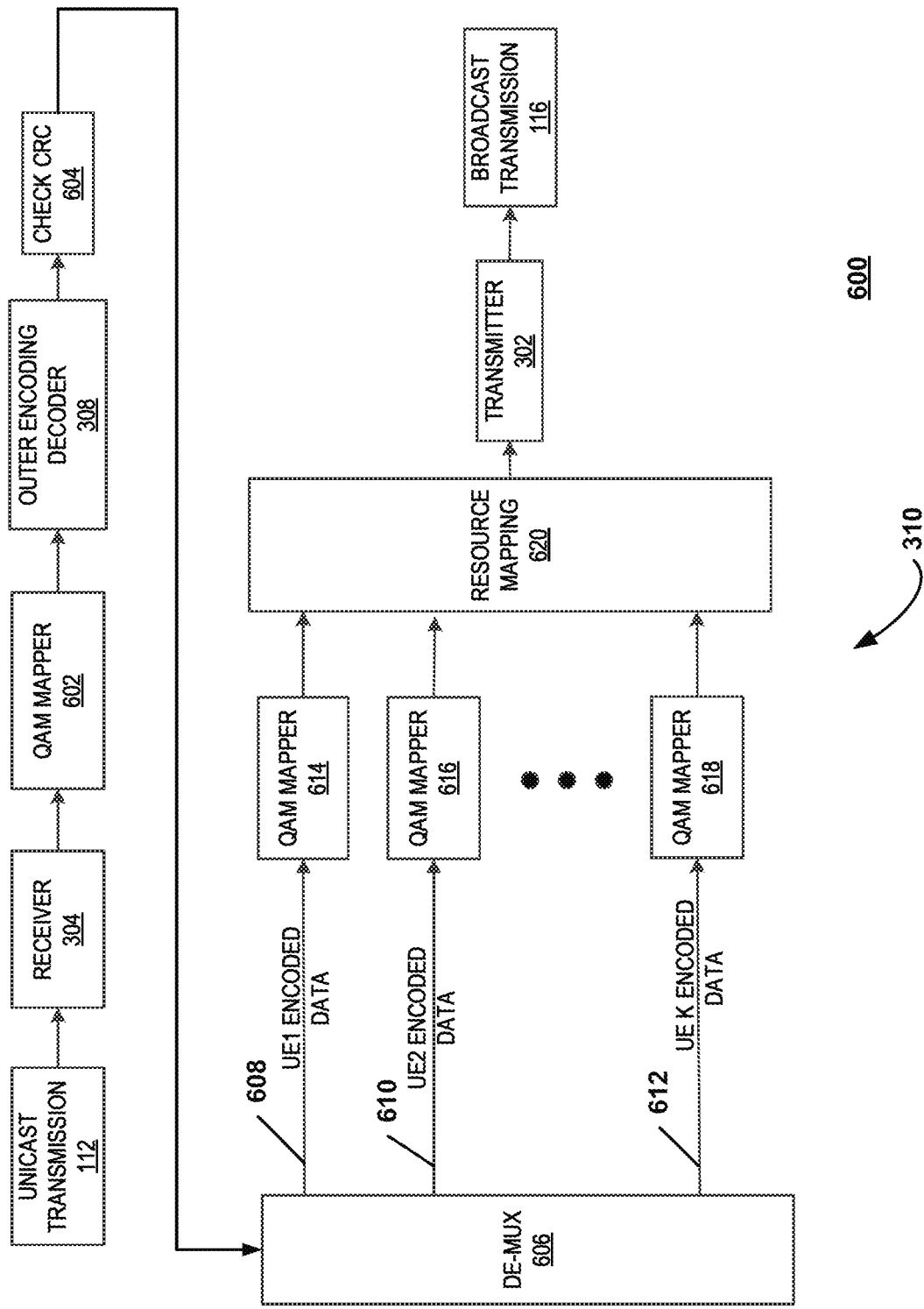
FIG. 6 is a block diagram of an example of the channel-aware decoder and the mapping processor within a relay node.

FIG. 6 is a block diagram of an example of the outer decoder 308 and the mapping processor 310 within a relay node. The example of FIG. 6 is suitable for implementation in the relay node 102, 300. Some of the components discussed with reference to FIG. 6 may be part of the receiver 304 and some may be part of the transmitter 302. The unicast transmission signal 112 is received by the receiver 304 through the antenna. A QAM mapper 602 demodulates and then the outer decoder 308 then decodes the resulting signal to decode only the outer encoding applied by the donor communication station. The CRC is checked by the CRC checking processor 604 before the data block is demultiplexed by the demultiplexer (DE-MUX) 606 to separate the data for each UE MTC device. The encoded data 608, 610, 612 for each UE MTC device is still encoded with broadcast encoding applied by the donor communication station.

A QAM mapper 614, 616, 618 modulates each encoded data stream 608, 610, 612 to generate QAM data blocks. A resource mapper 618 then assigns communication resources to the data of the multiple QAM data blocks. The output of the mapping encoder is a QAM data block grouped into M-bits where M is the order of the complex modulation $2^M$ symbols. For example, M=2 for QPSK symbols, M=4 for 16 QAM symbols, and M=6 for 64QAM symbols.

The resource mapper 620 assigns the modulated signals to communication resources. For the example, the resource-block mapping is performed in such a way that each individual stream is assigned a set of consecutive subcarriers forming a narrowband channel within the whole broadcast transmission bandwidth.

The encoded modulated data 622 is then transmitted by the transmitter as the broadcast transmission 116. The broadcast transmission includes the same information to be simultaneously provided to multiple UE devices. For the example, all of the data streams are transmitted to all the UE devices and the UE devices extract the information directed to the specific UE device. As discussed above, one example includes the data streams are structured in FDM manner.

Figure 7:
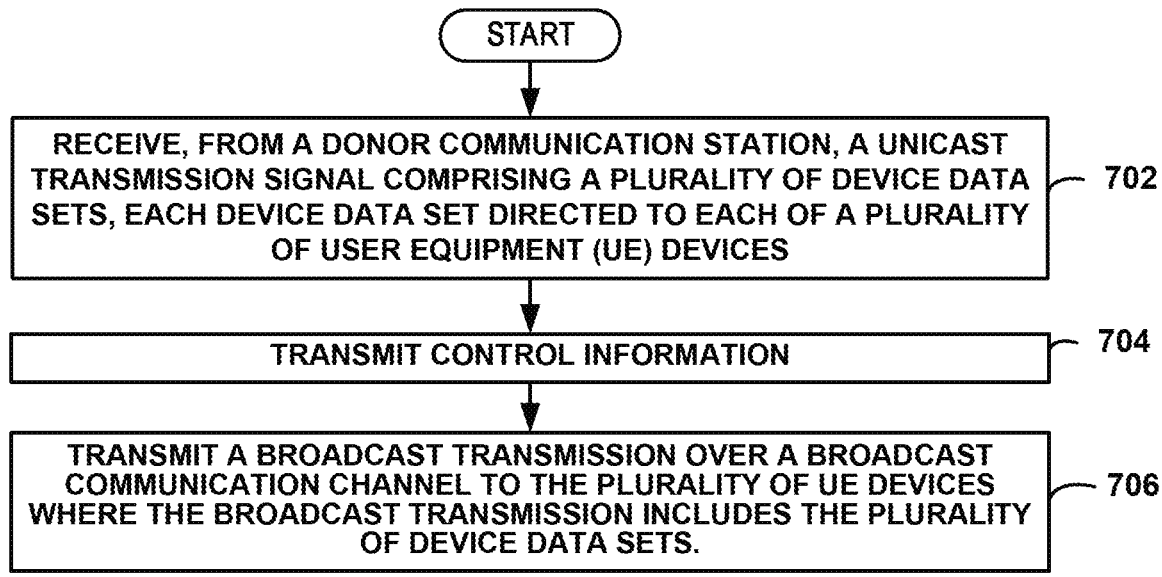
FIG. 7 is a flowchart of an example of a method of transmitting device data in a broadcast transmission where the device data is received in a unicast transmission from a donor communication station.

FIG. 7 is a flowchart of an example of a method of transmitting device data in a broadcast where the device data is received in a unicast transmission from a donor communication station. For the example, the method is performed by a relay node such as the relay node 102, 300. The steps of the method may be performed in a different order than described herein and shown in the example of FIG. 7. Furthermore, in some examples, one or more of the steps may be omitted. In other examples, one or more additional steps may be added. In some cases, multiple steps may be performed in parallel.

At step 702, a unicast transmission signal is received from a donor communication station where the unicast transmission signal includes a plurality device data sets for a plurality of UE devices, such as MTC or IOT UE devices. Each data set is intended for a single UE device. The unicast transmission is transmitted over a dedicated channel to the relay node.

At step 704, a control information is transmitted to the UE devices. The control information may include any of several control parameters. Examples of some control parameters include a modulation order, a code rate, identification of subsets of subcarriers that will be used to broadcast data to the UE device, and a frequency hopping pattern. More than one control information may be transmitted. In some situations, the control information is transmitted over a physical control channel. In other situations, the control information is transmitted over Radio Resource Control (RRC) protocol layer defined by a communication standard.

At step 706, a broadcast transmission is transmitted over a broadcast communication channel to the plurality of UE devices. The broadcast transmission includes the plurality of device data sets received from the donor communication station. For the examples herein, the same modulation order and code rate is applied to each device data set. The broadcast transmission may be transmitted using time division multiplexing (TDM) frequency division multiplexing (FDM), space division multiplexing (SDM), code division multiplexing (CDM) or any combination thereof.

Figure 8:
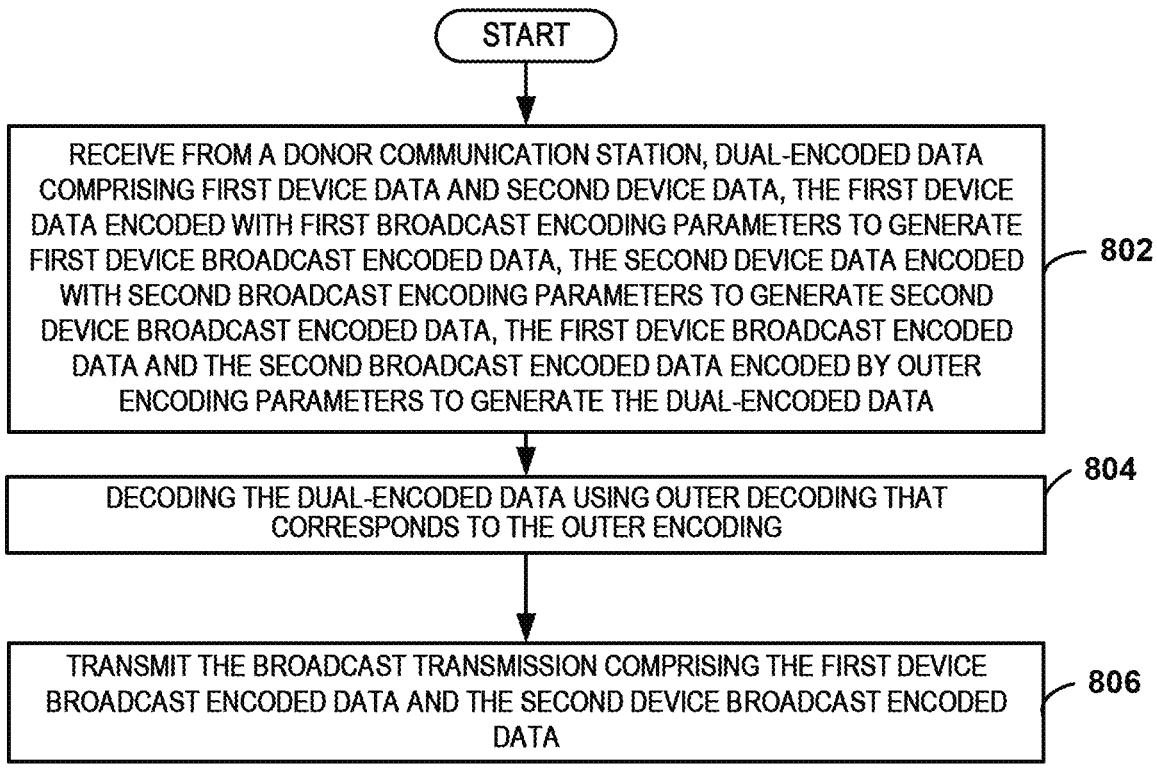
FIG. 8 is a flowchart of an example of a method of transmitting device data in a broadcast where the device data is received in a dual coded unicast transmission from a donor communication station.

FIG. 8 is a flowchart of an example of a method of transmitting device data in a broadcast where the device data is received in a dual coded unicast transmission from a donor communication station. For the example, the method is performed by a relay node such as the relay node 102, 300. The steps of the method may be performed in a different order than described herein and shown in the example of FIG. 8. Furthermore, in some examples, one or more of the steps may be omitted. In other examples, one or more additional steps may be added. In some cases, multiple steps may be performed in parallel.

At step 802, a unicast transmission is received from the donor communication station, where the unicast transmission includes dual-encoded data comprising first device data and second device data. The first device data is encoded with first broadcast encoding parameters to generate first device broadcast encoded data and the second device data is encoded with second broadcast encoding parameters to generate second device broadcast encoded data. The first device broadcast encoded data and the second broadcast encoded data are encoded by outer coding parameters to generate the dual-encoded data. The outer encoding may include channel-aware encoding in some situations.

At step 804, the dual-encoded data is outer decoded to decode the outer encoding. As a result, the outer decoding indicate transmission is decoded using outer decoding that corresponds to the outer encoding applied by the donor communication station.

At step 806, the broadcast transmission is transmitted to the UE devices where the broadcast transmission includes the first device broadcast encoded data and the second device broadcast encoded data. The broadcast transmission does not include outer encoding.

In some situations, the relay node provides information to the donor communication station. For example, the relay node may determine the preferred MCS for broadcast transmissions to the UE devices and provide the MCS to the donor communication station for the broadcast encoding. As a result, the method discussed with reference to FIG. 8 may include additional steps of determining channel conditions between the UE devices and the relay node and transmission of channel parameters, coding rates, modulation orders and other information to the donor communication station.

Therefore, the techniques discussed above reduce the need for complex scheduling functionality at the relay node. As a result, less expensive and complex communication equipment, such as UE devices, may more easily perform the functions of a relay node. In addition, signal quality and channel feedback requirements of the UE devices can be reduced which may provide particular advantages to MTC and IOT devices. In some situations, the UE device may provide some feedback to the relay node. For example, a UE device may provide NACK feedback where device data is not successfully received at the UE device although ACK messages may not be necessary. For such an example, the relay node may respond to a NACK by rebroadcasting the device data or sending the device data in a unicast transmission over a dedicated channel.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a relay node, the method comprising:
receiving, from a donor communication station, a unicast transmission comprising a plurality of device data sets, each device data set directed to each of a plurality of user equipment (UE) devices, the receiving the unicast transmission comprising receiving, from the donor communication station, dual-encoded data comprising first device data and second device data, the first device data encoded with first broadcast encoding parameters to generate first device broadcast encoded data, the second device data encoded with second broadcast encoding parameters to generate second device broadcast encoded data, the first device broadcast encoded data and the second broadcast encoded data encoded by outer encoding to generate the dual-encoded data;
decoding the dual-encoded data using outer decoding corresponding to the outer encoding; and
transmitting a broadcast transmission over a broadcast communication channel to the plurality of UE devices, the broadcast transmission comprising the first device broadcast encoded data and the second device broadcast encoded data.

2. The method of claim 1, further comprising:
transmitting, to the donor communication station, a preferred Modulation and Coding Scheme (MCS) for the broadcast encoding the first device data and second device data.

3. A relay node comprising:
a transmitter configured to transmit, to a donor communication station, a preferred Modulation and Coding Scheme (MCS) for broadcast encoding a plurality of device data sets;
a receiver configured to receive, from the donor communication station, a unicast transmission signal comprising the plurality of device data sets, each device data set directed to each of a plurality of user equipment (UE) devices; and
a transmitter configured to transmit a broadcast transmission over a broadcast communication channel to the plurality of UE devices, the broadcast transmission comprising the plurality of device data sets.

4. The relay node of claim 3, the transmitter comprising:
a modulator configured to applying a modulation order and a code rate to each device data set, the modulation order and the code rate being the same for the plurality of device data sets.

5. The relay node of claim 3, wherein the transmitter is configured to transmit the broadcast transmission using at least one of time division multiplexing (TDM) and frequency division multiplexing (FDM).

6. The relay node of claim 3, wherein the transmitter is configured to transmit the broadcast transmission using frequency division multiplexing (FDM), the relay node further comprising a controller configured to assign a subset of carriers that are only a portion of a downlink bandwidth available for downlink transmission to the UE devices.

7. The relay node of claim 6, the transmitter further configured to transmit control information to the UE devices identifying the subset of carriers, the control information being transmitted over at least one of a physical control channel and a Radio Resource Control (RRC) protocol layer defined by a communication standard.

8. The relay node of claim 3, wherein the transmitter is configured to transmit the broadcast transmission using frequency division multiplexing (FDM) and frequency hopping.

9. The relay node of claim 8, the transmitter further configured to transmit a control information to the UE devices identifying a frequency hopping pattern of the frequency hopping, the control information being transmitted over at least one of a physical control channel and a Radio Resource Control (RRC) protocol layer defined by a communication standard.

10. The relay node of claim 3, the transmitter further configured to retransmit the broadcast transmission with blind retransmissions.

11. The relay node of claim 3, wherein the receiver is configured to receive dual-encoded data in the unicast transmission, the dual-encoded data comprising first device data and second device data, the first device data encoded with first broadcast encoding parameters to generate first device broadcast encoded data, the second device data encoded with second broadcast encoding parameters to generate second device broadcast encoded data, the first device broadcast encoded data and the second broadcast encoded data encoded by outer encoding to generate the dual-encoded data; and
the relay node further comprising an outer decoder configured to decode the dual-encoded data by outer decoding corresponding to the outer encoding, the broadcast transmission comprising the first device broadcast encoded data and the second device broadcast encoded data.

12. The relay node of claim 11, wherein the outer encoding comprises channel-aware encoding.

13. A relay node comprising:
a receiver configured to receive, from a donor communication station, a unicast transmission comprising dual-encoded data comprising first device data directed to a first user equipment (UE) device and second device data directed to a second UE device, the first device data encoded with first broadcast encoding parameters to generate first device broadcast encoded data, the second device data encoded with second broadcast encoding parameters to generate second device broadcast encoded data, the first device broadcast encoded data and the second broadcast encoded data encoded by outer encoding to generate the dual-encoded data;
a decoder configured to decode the dual-encoded data using outer decoding corresponding to the outer encoding; and
a transmitter configured to transmit a broadcast transmission over a broadcast communication channel to the first UE device and the second UE device, the broadcast transmission comprising the first device broadcast encoded data and the second device broadcast encoded data.

14. The relay node of claim 13, further comprising:
a modulator configured to apply a modulation order and a code rate to the first device broadcast encoded data and the second device broadcast encoded data, the modulation order and the code rate being the same for the plurality of device data sets.

15. The relay node of claim 13, the transmitter further configured to transmit, to the donor communication station, a preferred Modulation and Coding Scheme (MCS) for the broadcast encoding.

16. The relay node of claim 13, wherein transmitter is configured to transmit the broadcast transmission using at least one of time division multiplexing (TDM) and frequency division multiplexing (FDM).

17. The relay node of claim 13, wherein the transmitter is configured to transmit the broadcast transmission using frequency division multiplexing (FDM) using a subset of carriers that are a portion of a downlink bandwidth available for downlink transmission to the first UE device and the second UE device.

18. The relay node of claim 17, wherein the transmitter is configured to transmit control information to the first UE device and the second UE device identifying the subset of carriers, the control information being transmitted over at least one of a physical control channel and a Radio Resource Control (RRC) protocol layer defined by a communication standard.

19. The relay node of claim 13, wherein the transmitter is configured to transmit the broadcast transmission using frequency division multiplexing (FDM) and frequency hopping.

20. The relay node of claim 19, wherein the transmitter is configured to transmit to the first UE device and the second UE device, frequency hopping control information over at least one of a physical control channel and a Radio Resource Control (RRC) protocol layer defined by a communication standard, the frequency hopping control information identifying a frequency hopping pattern of the frequency hopping.

21. The relay node of claim 13, the transmitter further configured to retransmit the broadcast transmission with blind retransmission.

22. The relay node of claim 13, wherein the outer encoding comprises channel-aware encoding.

* * * * *